(12) United States Patent
Dielacher et al.

(10) Patent No.: US 10,101,453 B2
(45) Date of Patent: Oct. 16, 2018

(54) TIME OF FLIGHT APPARATUSES AND AN ILLUMINATION SOURCE

(71) Applicant: Infineon Technologies AG, Neubiberg (DE)

(72) Inventors: Markus Dielacher, Graz (AT); Martin Flatscher, Graz (AT); Michael Mark, Graz (AT); Josef Prainsack, A-Graz (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 14/812,003

(22) Filed: Jul. 29, 2015

(65) Prior Publication Data
US 2016/0041264 A1    Feb. 11, 2016

(30) Foreign Application Priority Data
Aug. 11, 2014  (DE) .................. 10 2014 111 431

(51) Int. Cl.
*G01C 3/08*    (2006.01)
*G01S 17/10*    (2006.01)
(Continued)

(52) U.S. Cl.
CPC ............ *G01S 17/10* (2013.01); *G01S 7/4865* (2013.01); *G01S 7/497* (2013.01); *G01S 7/4915* (2013.01);
(Continued)

(58) Field of Classification Search
CPC ...... G01S 17/10; G01S 7/4865; G01S 7/4915; G01S 7/497; G01S 17/36; G01S 17/89; H04N 5/33
See application file for complete search history.

(56) References Cited

U.S. PATENT DOCUMENTS 7,952,690 B2    5/2011  Cauquy et al.
2006/0290210 A1*  12/2006  Foard .................. H02G 3/00
                                                                    307/147
(Continued)

FOREIGN PATENT DOCUMENTS

CN    101865997 A    10/2010
CN    102565871 A    7/2012
(Continued)

OTHER PUBLICATIONS

Office Action dated Apr. 27, 2017 for Chinese Patent Application No. 201510488195.3.

*Primary Examiner* — Samantha K Abraham
(74) *Attorney, Agent, or Firm* — Schiff Hardin LLP (57) ABSTRACT

An apparatus includes a detector circuit configured to receive a modulated electromagnetic wave signal from an illumination source and to provide a detection signal having a frequency dependent on a modulation frequency of the modulated electromagnetic wave signal. The apparatus further includes a reference circuit configured to generate a reference signal based on the detection signal. The apparatus further includes a sensor circuit configured to generate based on the reference signal a sensor signal based on reflected modulated electromagnetic waves emitted by the illumination source and reflected by an object. The apparatus further includes a processing circuit configured to determine distance information related to the object based on the sensor signal.

19 Claims, 4 Drawing Sheets

(51) Int. Cl.
    *G01S 7/486*     (2006.01)
    *G01S 17/89*     (2006.01)
    *H04N 5/33*     (2006.01)
    *G01S 17/36*     (2006.01)
    *G01S 7/491*     (2006.01)
    *G01S 7/497*     (2006.01)

(52) U.S. Cl.
    CPC .............. *G01S 17/36* (2013.01); *G01S 17/89* (2013.01); *H04N 5/33* (2013.01)

(56) References Cited

U.S. PATENT DOCUMENTS

| | | | |
|---|---|---|---|
| 2009/0020687 A1* | 1/2009 | Lehmann | G01S 7/4816 250/208.1 |
| 2010/0066589 A1* | 3/2010 | Sai | G01F 23/284 342/124 |
| 2012/0062729 A1* | 3/2012 | Hart | G06F 1/1626 348/135 |
| 2012/0092485 A1* | 4/2012 | Meinherz | F16P 3/142 348/91 |

FOREIGN PATENT DOCUMENTS

| | | |
|---|---|---|
| CN | 102567986 A | 7/2012 |
| CN | 102622745 A | 8/2012 |
| DE | 102011081561 A1 | 8/2013 |
| EP | 1933168 A1 | 6/2008 |
| EP | 2017651 A2 | 1/2009 |
| JP | 3161738 B2 | 4/2001 |
| KR | 20110085785 A | 7/2011 |
| KR | 20120099115 A | 9/2012 |
| WO | WO-2004100551 A1 | 11/2004 |

* cited by examiner

TIME OF FLIGHT APPARATUSES AND AN ILLUMINATION SOURCE

TECHNICAL FIELD

Embodiments relate to determining distance information and in particular to Time of Flight apparatuses and to an illumination source.

BACKGROUND

Time-of-flight (TOF) cameras are based on a measurement of a delay between the emission of an optical infra-red (IR) signal, which is then reflected by an object, and the reception of the optical signal at a photon mixing device (PMD) imager. The measured delay is proportional to the distance of the object. This principle may be very sensitive to delays caused by the components inside the camera. For example, delays tend to occur between the electrical illumination-control signal generated by the chip and the actual emitted optical signal. For example, the driver of the illumination unit which emits the IR signal, may cause an additional (temperature and voltage dependent) delay, which may distort the measurement. Additionally, the driver consumes a lot of power and may disturb other sensitive building blocks on the chip. When the illumination unit is placed apart from the imager (e.g. in automotive applications the imager might be placed below the rear-view mirror and the illumination unit in the head lights) the control may be especially challenging and expensive due to long distances between the illumination unit and the imager.

SUMMARY

It is a demand to provide an apparatus for determining distance information with improved accuracy and/or minimized errors caused by component delays.

Such a demand may be satisfied by the subject matter of the claims.

Some embodiments relate to an apparatus which includes a detector circuit configured to receive a modulated electromagnetic wave signal from an illumination source and to provide a detection signal having a frequency dependent on a modulation frequency of the modulated electromagnetic wave signal. The apparatus further includes a reference circuit configured to generate a reference signal based on the detection signal. The apparatus further includes a sensor circuit configured to generate based on the reference signal a sensor signal based on reflected modulated electromagnetic waves emitted by the illumination source and reflected by an object. The apparatus further includes a processing circuit configured to determine distance information related to the object based on the sensor signal.

Some embodiments relate to an apparatus which includes a receiver circuit configured to receive a modulation control signal from an illumination source. The modulation control signal has a modulation frequency based on a frequency of modulated electromagnetic waves emitted by the illumination source. The apparatus further includes a reference circuit configured to generate a plurality of reference signals having different phase offsets based on the modulation control signal. The apparatus further includes a sensor circuit configured to generate based on the plurality of reference signals a plurality of sensor signals based on reflected modulated electromagnetic waves emitted by the illumination source and reflected by an object. The apparatus further includes a processing circuit configured to determine distance information related to an object based on the plurality of reference signals and the reflected modulated electromagnetic waves.

Some embodiments relate to an illumination source. The illumination source includes an oscillator circuit configured to generate an oscillator signal having a predefined oscillator signal frequency. The illumination source further includes an emitting circuit configured to emit to an external time of flight camera a modulated electromagnetic wave signal having a modulation frequency based on the predefined oscillator signal frequency of the oscillator signal.

BRIEF DESCRIPTION OF THE FIGURES

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
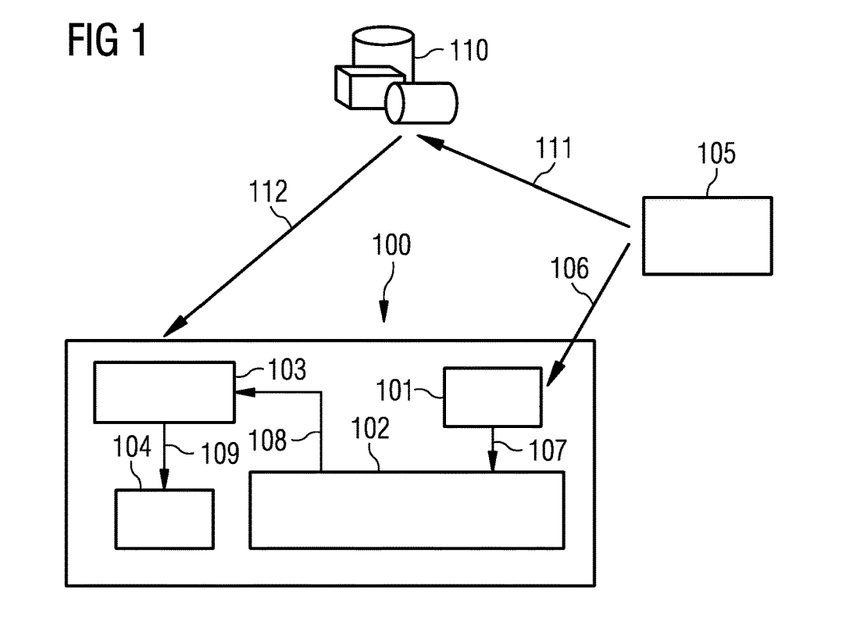
FIG. 1 shows a schematic illustration of a Time of Flight apparatus.

FIG. 1 shows a schematic illustration of an apparatus 100 according to an embodiment.

The apparatus 100 includes a detector circuit 101 configured to receive a modulated electromagnetic wave signal 106 from an illumination source and to provide a detection signal 107 having a frequency dependent on a modulation frequency of the modulated electromagnetic wave signal 106.

The apparatus 100 further includes a reference circuit 102 configured to generate a reference signal 108 based on the detection signal 107.

The apparatus 100 further includes a sensor circuit 103 configured to generate based on the reference signal 108 a sensor signal 109 based on reflected modulated electromagnetic waves 112 emitted by the illumination source and reflected by an object.

The apparatus 100 further includes a processing circuit 104 configured to determine distance information related to the object based on the sensor signal 109.

Due to the implementation of a detector circuit gathering frequency information of the modulated electromagnetic wave signal, a very accurate distance information determination may be enabled, since delays such as those of components triggering the modulation of the illumination source may be avoided, for example. Therefore, distortion of distance measurements may be avoided or reduced, for example.

The apparatus 100 may include or be an imaging device or a device which may be used to determine distance information related to an object 110. For example, the apparatus 100 may be a camera, such as a time of flight (TOF) camera. It may be desired to determine distance information related to the object 110. The object may be a person, or thing, or scenery to be photographed, for example. For example, the object may be three-dimensional (3D), e.g. the object may have a height, width and depth. In the case where the apparatus 100 is an imaging device, e.g. a TOF camera, the apparatus 100 may be used to produce a three-dimensional image of the object.

The distance information to be determined by the apparatus 100 may be a distance between one or more different locations or one or more points of the surface profile of the object to the apparatus 100, for example. By determining the distance information related to the object, three-dimensional information (e.g. the height, width and depth) about the object may be determined by the apparatus.

An illumination source 105 may be arranged external to the apparatus 100. For example, the illumination source 105 and the apparatus 100 may be electrically isolated from each other, or no additional electrical signals may be transferred between them. For example, the illumination source 105 and the apparatus 100 may be connected to a common ground. The illumination source may be configured to generate the modulated electromagnetic (EM) wave signal 106, e.g. at a predetermined modulation frequency, fm. The modulated EM wave signal 106 may be an amplitude (intensity) modulation of the electromagnetic waves of the electromagnetic wave signal 106. This may be generated by or be based on an oscillator signal generated within the illumination source having the predetermined modulation frequency.

The detector circuit 101 may be configured to receive the modulated EM wave signal 106 from the illumination source 105. The modulated EM wave signal 106 may include or be an infra-red electromagnetic wave signal (e.g. infra-red light), for example. For example, the EM waves of the EM wave signal may have a wavelength which lies between 700 nm and 1 mm. In another implementation of the embodiment, the modulated EM wave signal 106 may include or be a visible electromagnetic wave (e.g. visible light). For example, the EM waves of the EM wave signal may have a wavelength which lies between 500 nm and 700 mm. The modulated EM wave signal 106 may be transmitted from the illumination source 105 and received by the detector circuit 101 over air or via an optical fiber, for example.

The detector circuit 101 may include any circuit having the capabilities or that is configured to detect the modulated EM wave signal 106. For example, the detector circuit 101 may include or may be at least part of an infra-red light photodetector configured to detect an infra-red EM wave signal. In another implementation of the embodiment, the detector circuit 101 may include or may be at least part of visible light photodetector configured to detect a visible EM wave signal. The detector circuit 101 may also provide a detection signal comprising a voltage or current proportional to an intensity of the EM wave signal 106 received by the detector circuit 101. In this way, the detector circuit 101 may be configured to provide and/or generate the detection signal 107, based on the received EM wave signal. The detection signal 107 may have a frequency, fd, which may be based on or depend on the modulation frequency, fm, of the modulated EM wave signal 106. For example, the frequency of the detection signal 107 may be substantially equal to or a multiple of a modulation frequency, fm, of the modulated EM wave signal 106. For example, a deviation of the detection signal frequency from the modulation frequency may depend on the used detection circuit. The deviation may be below 1% of the modulation frequency, for example.

The detector circuit 101 may be configured to provide the detection signal 107 to the reference circuit 102. The reference circuit 102 may be configured to generate the reference signal 108 based on the detection signal 107. The reference circuit 102 may be used for the purpose of reference recovery, for example. For example, the reference circuit 102 may recover a reference signal with a frequency, fr, based on the detection signal 107 with a frequency, fd. For example, the frequency, fr, of the reference signal may be based on or depend on or be substantially equal to or a multiple of a frequency, fd, of the detection signal 107. Therefore, the frequency, fr, of the reference signal may also be substantially equal to or a multiple of a modulation frequency, fm, of the modulated EM wave signal 106, for example.

The reference signal 108 may be a periodic signal, such as a sinusoidal or a square signal, for example. The frequency, fr, may lie between 1 MHz to 300 MHz, e.g. between 5 MHz to 100 MHz, e.g. between 5 MHz to 30 MHz, for example. The reference signal 108 may have a frequency greater than 1 MHz, or greater than tens of MHz, for example. For example, the reference signal, fr, may range from about 1 MHz to about 5 MHz or from about 1 MHz to about 10 MHz or from about 1 MHz to about 20

MHz or higher. The emitting and receiving time intervals may range over one or more periods of the reference signal, for example.

The reference circuit 102 may be configured to provide the reference signal 108 to the sensor circuit 103. The sensor circuit 103 may include at least one pixel element, e.g. a photonic mixing device (PMD) or be at least part of an image sensor circuit, for example, and may include a pixel sensor array, e.g. an array of pixel elements, for example. Each pixel element of the pixel array may be configured to receive reflected modulated EM waves 112, which may be emitted 111 by the illumination source 105 and reflected 112 by an object 110, for example.

The operation of the sensor circuit 103 may be controlled by the reference signal 108. For example, the reference signal 108 may be a biasing signal applied to the pixel elements of the sensor circuit for turning on or off of the pixel elements (e.g. or the photogate(s)) of the sensor circuit. For example, the reference signal 108 may alternatingly bias or toggle each of the photogates of the PMD at a biasing frequency, based on or equal to or a multiple of the frequency of the reference signal 108. The reference signal may therefore control the operation of the sensor circuit 103 and the generation of a sensor signal 109 generated by a pixel element in response to the incoming reflected modulated EM waves 112 received by the pixel element. The sensor signal 109 may comprise a voltage or current proportional to a number of photogenerated charge carriers generated at a pixel element when the reference signal is applied to one or more photogates of the pixel element, for example.

The processing circuit 104 may be configured to produce a distance information of one or more points (e.g. only one point, a line of points, or an array of points) of an image, e.g. a three-dimensional image of the object based on the sensor signal 109 received by the sensor circuit 103 by determining a phase delay between the detection signal 108 and the incoming reflected modulated EM waves 112. By determining the distance information, the three-dimensional image of the object may be produced. For example, the image produced may be final image of the object for example, or a pre-final image, which may be used to produce the final image of the object, for example. For example, a plurality, e.g. a sequence, of pre-final images may be used to produce the final image of the object. In some implementations, at least part of the processing circuit 104 may be implemented within the pixel image array, for example within the pixel sensor array.

Due to the implementation of the apparatus, the reference signal 108 used for the processing of the sensor signal 109 may be generated in the apparatus, whereas the reflected EM wave signal may be generated by an external illumination source. Therefore, errors in distance measurements due to component delays, such as between an on-chip modulation/reference generator to the illumination source, may be avoided, for example. Furthermore, with the driver of the illumination source being external to the apparatus, interferences between the driver and sensitive components of the apparatus, e.g. the processing circuit, may be reduced or avoided, for example. For example, temperature and voltage dependent delays caused by a driver of the illumination source may be avoided, for example.

Optionally, the processing circuit 104 already described in the embodiments above may be configured to compare distance information related to a calibration object (e.g. the illumination source) determined by the processing circuit 104 to a known distance value of the calibration object to determine a calibration offset value, and to determine the distance information related to the object based on the sensor signal and the calibration offset value. For example, if the physical distance between the apparatus 100, (e.g. the imager) and the illumination source 105 is known, the information of the known distance value (see arrow 618 in FIG. 6) may be used for online calibration. For example, a calibration offset value may be determined which may be based on or equal to an offset (e.g. difference) value between the known distance value and the distance information determined by the apparatus. The calibration offset value may be used by the processing circuit 104 to determine the (absolute) distance information related to the object. Otherwise only relative distances may be measured. In this case, the measurement may be undistorted by electrical delays, for example.

Figure 2:
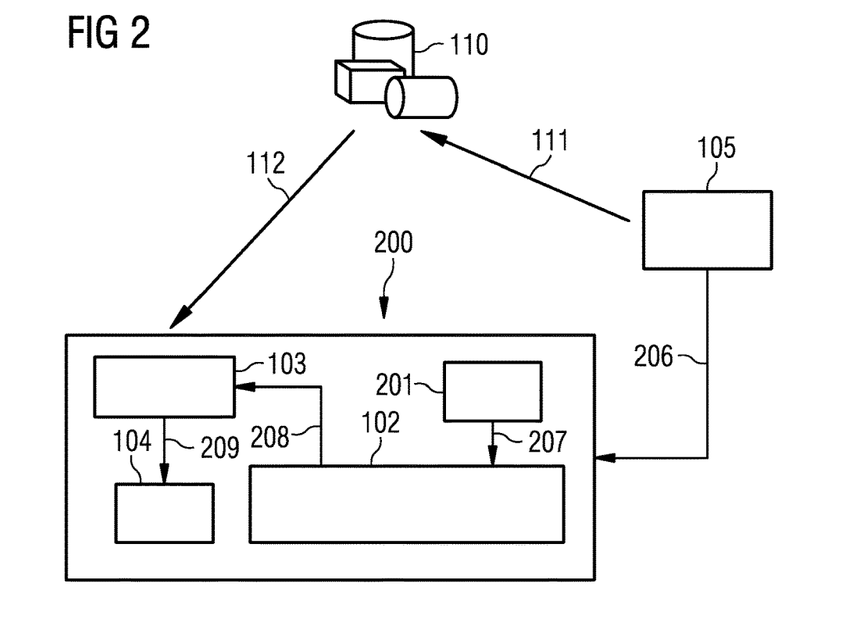
FIG. 2 shows a schematic illustration of a further Time of Flight apparatus.

FIG. 2 shows a schematic illustration of an apparatus 200 according to an embodiment.

The apparatus 200 includes a receiver circuit 201 configured to receive a modulation control signal 206 from an illumination source external to the apparatus 200. The modulation control signal 206 has a modulation frequency based on a frequency of modulated electromagnetic waves emitted by the illumination source.

The apparatus 200 further includes a reference circuit 102 configured to generate a plurality of reference signals 208 having different phase offsets based on the modulation control signal 206.

The apparatus 200 further includes a sensor circuit 103 configured to generate based on the plurality of reference signals 208, a plurality of sensor signals 209 based on received reflected modulated electromagnetic waves 112 emitted by the illumination source and reflected by an object.

The apparatus 200 further includes a processing circuit 104 configured to determine distance information related to an object based on the plurality of reference signals 208 and the reflected modulated electromagnetic waves 112.

The apparatus 200 may be a TOF apparatus and may be used for determining distance information related to an object. In the embodiment of FIG. 1, the modulated EM wave signal 106 may be transmitted from the illumination source 105 to the apparatus 100 via air or optical fiber, for example. The detector circuit 101 may be a photoreceiver, e.g. a photodiode, such as an infra-red photodiode. In the embodiment of FIG. 2, the modulation control signal 206 may be an electrical signal, e.g. a voltage or current signal, which may be transmitted to the apparatus 200, e.g. to receiver circuit 201, via a physical connection, e.g. via electrical wires or through a wireless connection. In which case, the receiver circuit 201 may be any circuit or capable of receiving the modulation control signal 206 and generating a modulation signal 207 based on the modulation control signal 206, or providing the received modulation control signal 206 as the modulation signal 207.

The illumination source 105 and the apparatus 100 may be electrically isolated from each other. For example, the illumination source 105 and the apparatus 100 may be connected to a common ground.

Due to the implementation of a the detector circuit gathering frequency information of the modulated electromagnetic wave signal from the external illumination source, a very accurate distance information determination may be enabled, since delays such as those of components triggering the modulation of the illumination source may be avoided, for example. Therefore, distortion of distance measurements may be avoided or reduced, for example. Furthermore, with the driver of the illumination source being external to the apparatus, interferences between the driver and sensitive components of the apparatus, e.g. the processing circuit, may be reduced or avoided, for example.

More details and aspects are mentioned in connection with the embodiments described above or below (e.g. regarding the receiver circuit, the reference circuit, the sensor circuit, the processing circuit). The embodiment shown in FIG. 2 may comprise one or more optional additional features corresponding to one or more aspects mentioned in connection with the proposed concept or one or more embodiments described above (e.g. FIG. 1) or below (e.g. FIGS. 3 to 7).

Figure 3:
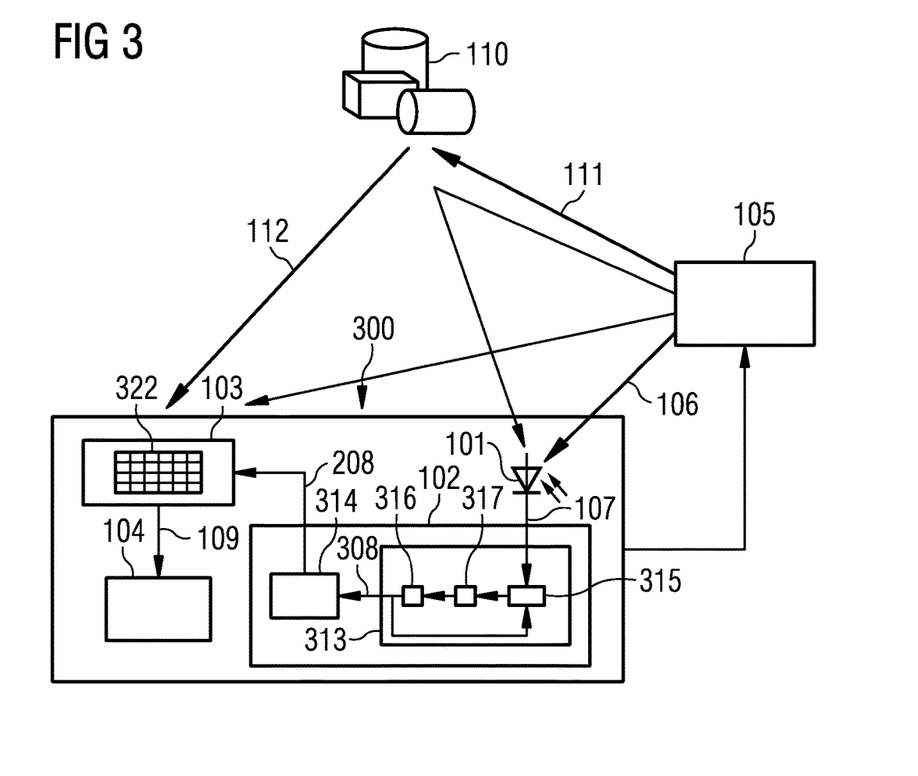
FIG. 3 shows a schematic illustration of a further Time of Flight apparatus.

FIG. 3 shows a schematic illustration of an apparatus 300 according to an embodiment. The implementation of the apparatus 300 is similar to the implementations shown in FIGS. 1 and 2.

In the example shown in FIG. 3, the reference circuit 102 may include a phase locked loop circuit or a delay locked loop circuit configured to generate the reference signal 308 based on the detection signal 107 and the modulation signal. The phase locked loop circuit or the delay locked loop circuit may be implemented as an analog or digital circuit for example. For example, the phase locked loop circuit 313 (shown in FIG. 3) may include a reference oscillator circuit 316 configured to generate a reference oscillator signal, for example. The reference signal 308 may be based on or may be a phase-locked reference oscillator signal generated by the reference oscillator circuit, and phase locked to the detection signal 107. The reference oscillator circuit 316 may include or be a voltage controlled oscillator, for example, which may be arranged in a separate circuit from the imager, e.g. in a separate circuit from the sensor circuit 103. For example, the reference oscillator circuit 316 may be arranged so that it is not a part of the imager chip with the pixel array, for example. For example, the reference oscillator circuit 316 may be a tunable crystal oscillator. The phase locked loop circuit 313 may also include a phase comparator 315 configured to compare a phase of the reference oscillator signal and the phase of the detection signal 107 received by the phase comparator 315. The phase locked loop circuit 313 may be implemented a way that the output reference oscillator signal 308 may be fed back to a first input terminal of the phase comparator and a second input terminal of the phase comparator 315 may receive the detector signal. The phase comparator 315 may be configured to generate a comparison signal based on a comparison of a phase of the reference oscillator signal 308 and a phase of the detection signal 107 received by the phase comparator 315. For example, the comparison signal may indicate or be proportional to a phase difference between the phase of the reference oscillator signal and the phase of the detection signal.

The phase locked loop circuit 313 of the apparatus may further include a loop filter 317, which may be connected between the phase comparator and the reference oscillator circuit 316. The loop filter 317 may include a low pass filter for example. The comparison signal may be filtered by the loop filter 317 and the filtered signal may be used to drive or control a reference oscillator signal 308 output by the reference oscillator circuit 316. The reference oscillator signal 308 output of the reference oscillator circuit 316 may be controlled or be based on a phase difference between a fed back reference oscillator signal 308 and the detection signal 107. The phase locked loop circuit 313 may be configured to adjust a phase of the reference oscillator signal 308 to the phase of the detection signal 107 based on the comparison signal, and the phase of the reference oscillator signal 308 output may be locked to or match the phase of the detector signal 107. For example, the predefined oscillator signal frequency may lie between 1 MHz and 300 MHz, e.g. between 5 MHz to 100 MHz, e.g. between 5 MHz to 30 MHz.

Figure 6:
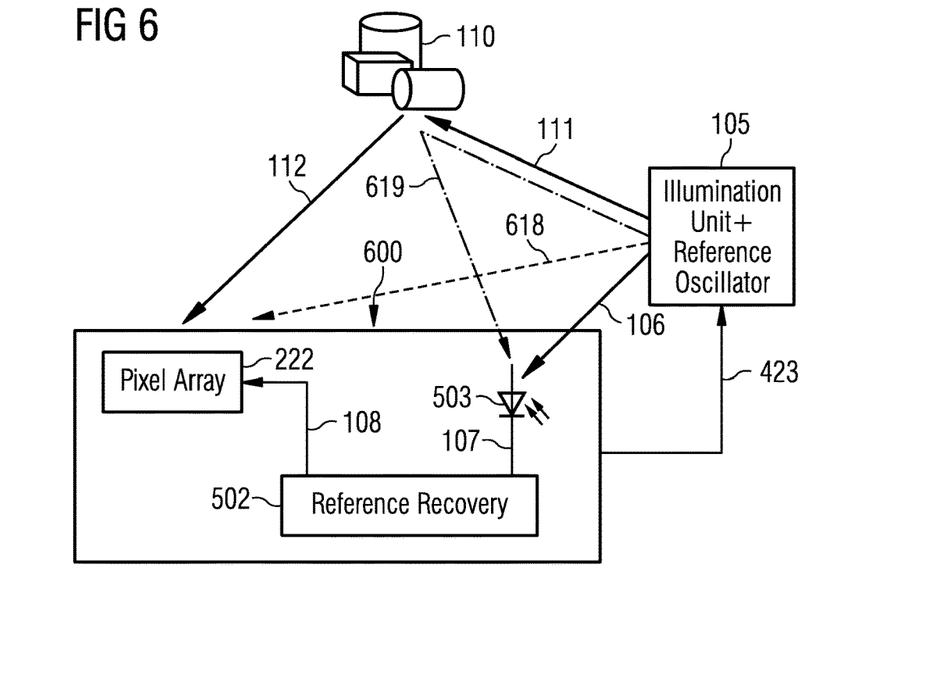
FIG. 6 shows a schematic illustration of a further Time of Flight apparatus.

In order to produce a stable reference signal 308, a bandwidth of the loop filter 317 may be selected so that there may be low reaction to noise or jitter. For example, the bandwidth may be based on a required or desired exposure time. For example, the exposure time refers to the amount of time that the sensor circuit 103 (e.g. the pixel array) may be exposed to the incoming reflected EM waves 112 for the determination of the distance information. The bandwidth of the loop filter 317 of the phase locked loop circuit 313 may be configured in a way that the generated reference signal may be substantially constant (for example, may have a constant phase) at least for the exposure time, e.g. between 100 us to few ms, e.g. 2, 5, 10 ms. For example, the bandwidth of the loop filter 317 may be based on between −10% to 10% of the exposure time. The band width of the loop filter 317 may have a bandwidth frequency range below 100 KHz, e.g. between 100 Hz to 10 KHz, e.g. about 1 to 2 KHz, for example. In this case, it may have minor impact or no impact if the light comes directly from the illumination unit or if the light is reflected by an object, for example (see arrow 619), and the apparatus (e.g. the TOF System) may use a self-synchronized illumination unit with different propagation paths (e.g. represented by arrows 618 or 619), as shown in FIG. 6.

The reference circuit 102 may further include a phase shift circuit 314, which may be connected to the phase locked loop circuit 313, or which may be implemented as part of the phase locked loop. The phase shift circuit 314 may be configured to generate sequentially a plurality of reference signals 208 having different phase offsets compared to the detection signal 107. For example, a reference signal may have a first phase offset with respect to the detection signal 107. A subsequent second reference signal may have a second (different) predetermined phase offset compared to the detection signal 107 and so forth.

The plurality of reference signals 208 may be sequentially applied to the sensor circuit 103, (e.g. to each pixel element of a pixel sensor array 322). The frequency and/or frequencies, fr, of the reference signal and/or plurality of reference signals 208, applied to the photogates may be based on or equal to or a multiple of the modulation frequency, fm, of the modulation reference signal 108.

Each pixel element may include transparent charge collecting photogates, e.g. a plurality of photogates. In a multiple photogate pixel element, the plurality of reference signals 208 having different phase offsets may be applied to the photogates of the pixel element. For example, each photogate in the pixel element may be biased by a reference signal having a different phase offset. For example, a two-photogate pixel element may have a first photogate and a second photogate. For example, a first reference signal may be applied to the first photogate, and an inverse of the first reference signal may be applied to the second photogate. Afterwards, a second reference signal with a different phase may be applied to the first photogate, and an inverse of the second reference signal may be applied to the second photogate. For example, two reference signals and inverse signals of the two reference signals may be used, wherein the first reference signal may comprise a phase offset from the second reference signal of 90°, 120°, 150°, or 180° for example. In this way, more than one sensor signal based on the reference signals 208 with different offsets may be generated at the same time or the accuracy of the sensor signal may be increased.

As the received reflected EM waves 112 may be modulated with the same frequency as the applied bias to the photogates of the pixel element, the difference in the electrical signal output from the first photogate and the second photogate may be directly dependent on the phase delay between the illumination source and the PMD sensor circuit 103. A cross-correlation function of the reference signal 108 and the sensor signal 109 may be used to determine the distance information between the object and the sensor circuit 103. The distance information calculated may be proportional to the phase delay between the reflected EM waves 112 and the detection signal 107 divided by the modulation frequency, for example.

The processing circuit 104 may be configured to determine a maximum of a cross-correlation function based on the sensor signal 109 and the reference signal 108 to determine the distance information related to the object. For example, the phase delay may be determined based on cross-correlation values represented by magnitudes (e.g. voltage or current) of the plurality of sensor signals 209 generated based on the reflected EM waves 112 and the plurality of reference signals 208. For example, the phase delay may be determined by identifying the phase offset corresponding to a maximum cross-correlation value represented by a sensor signal 109 generated by a reference signal with a phase matching the phase of the modulated electromagnetic wave best and/or e.g. by identifying the phase offset corresponding to a maximal detected current or voltage, for example.

Although the operation of the sensor circuit is described herein with respect to a single pixel element, it may be understood that the pixel elements of the pixel array of the sensor circuit are configured to operate concurrently, and that phase delay detection of the reflected EM waves may be carried out by the plurality of pixel elements of the pixel array in parallel, for example. For example, the plurality of reference signals 208 may be applied to each of the pixel elements of the sensor circuit concurrently.

The pixel array 322 may be a two-dimensional array of pixel elements, for example. Each pixel element may include a photodetector circuit for the detection of incoming EM waves, such as the incoming reflected EM waves 112. The photodetector circuit may be configured to generate the sensor signal 109 of the pixel element, and the sensor signal 109 of the pixel element may be proportional to a number of photogenerated charge carriers generated by the pixel element due to the reflected modulated EM waves by the pixel element. For example, the sensor circuit 103 may be configured as a PMD. For example, each pixel element may be configured as a PMD circuit to produce pixel image data which represents distance information or data for generating distance information about the object, based on the EM waves received by the pixel element.

Each photogate may include a generation zone, e.g. a photosensitive region, such as a depletion region or space charge region, where photogenerated charge carriers may be generated by the incoming reflected EM waves, for example. The photogenerated charge carriers may include positive charge-carriers, e.g. holes, or negative charge-carriers, e.g. electrons, for example. The number of photogenerated charge carriers generated in the generation zone may be proportional to the intensity of the reflected EM waves 112 received by the photogate when the photogate is biased by the applied reference signal 108. The sensor signal 109 may be based on the number of photogenerated charge carriers generated in the generation zone, and may be a voltage, current or resistance signal, for example.

In some examples, the detector circuit 101 may include one or more pixels from the pixel array 322 of the sensor circuit 103. For example, the one or more pixels from the pixel array 322 of the sensor circuit 103 may be configured to at least partially carry out the functions of the detector circuit 101. For example, the one or more pixels may be configured to receive a modulated electromagnetic wave signal 106 from an illumination source external to the apparatus, and may provide the detection signal 107 to the reference circuit 102 to generate the reference signal 108. The one or more pixels may receive the modulated electromagnetic wave signal 106 and provide the detection signal 107 without activating the correlations functions of the PMD, for example, without integration calculations which may be required for acquiring distance information related to the object. Subsequently, the one or more pixels from the pixel array 322 of the sensor circuit 103 may be used to determine the distance information related to the object or to generate the three-dimensional image of the object based on the cross-correlation functions described above.

More details and aspects are mentioned in connection with the embodiments described above or below (e.g. regarding the receiver circuit, the reference circuit, the sensor circuit, the processing circuit). The embodiment shown in FIG. 3 may comprise one or more optional additional features corresponding to one or more aspects mentioned in connection with the proposed concept or one or more embodiments described above (e.g. FIGS. 1 and 2) or below (FIGS. 4 to 7).

Figure 4:
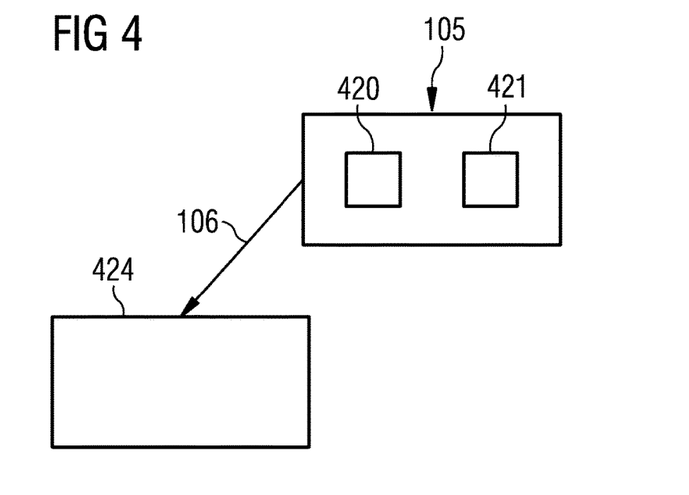
FIG. 4 shows a schematic illustration of an illumination source.

FIG. 4 shows a schematic illustration of an illumination source 105 according to an embodiment. The illumination source 105 includes an oscillator circuit 420 configured to generate an oscillator signal having a predefined oscillator signal frequency. The illumination source 105 further includes an emitting circuit 421 configured to emit to an external time of flight camera 424 a modulated electromagnetic wave signal 106 having a modulation frequency based on the predefined oscillator signal frequency of the oscillator signal.

The oscillator circuit 420 may be coupled to or at least part of a clock generator circuit, for example, for generating the oscillator having the predefined oscillator signal frequency. The modulation frequency may be substantially equal to or a multiple of the predefined oscillator signal frequency based on the oscillator signal, for example.

The emitting circuit 421 may include an infra-red EM wave or visible EM wave emitting circuit, and the modulated electromagnetic wave signal may include infra-red or visible electromagnetic waves, for example. The emitting circuit may include one or more infra-red or visible light emitting diodes, for example, and the oscillator circuit 420 may be coupled to the light emitting diodes so that the modulation frequency may be based on the predefined oscillator signal frequency of the oscillator signal.

The external time of flight camera 424 may be configured to have one or more or all of the features of apparatuses described above or below, for example. For example, the apparatus 100, 200, 300, 500, 600 may be configured as a time of flight camera which may be implemented in this embodiment to receive the modulated electromagnetic wave signal 106 from the illumination source 105.

Due to the implementation of the illumination source, (e.g. the generation of the oscillator signal by the illumination source), distance measurement errors caused by component delays, e.g. by an external modulation control device, (e.g. by a TOF camera), may be avoided.

More details and aspects are mentioned in connection with the embodiments described above or below (e.g. regarding the receiver circuit, the reference circuit, the sensor circuit, the processing circuit). The embodiment shown in FIG. 4 may comprise one or more optional additional features corresponding to one or more aspects mentioned in connection with the proposed concept or one or more embodiments described above (e.g. FIGS. 1 to 3) or below (e.g. FIGS. 5 to 7).

Figure 5:
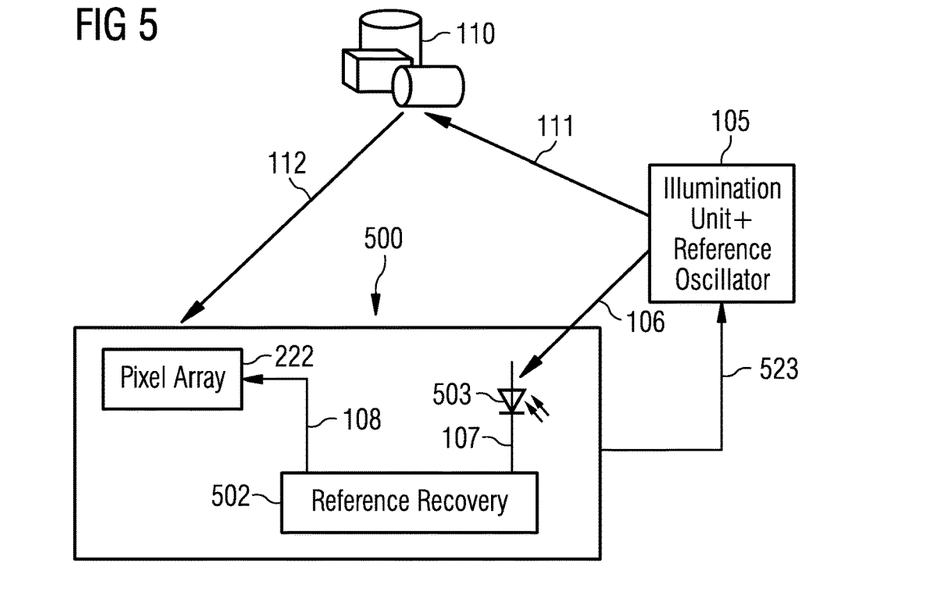
FIG. 5 shows a schematic illustration of a further Time of Flight apparatus.

FIG. 5 shows a schematic illustration of an apparatus 500 according to an embodiment. The implementation of the apparatus 500 is similar to the implementations shown in FIG. 1. As shown in FIG. 5, the apparatus 500 may be optionally connected to the illumination source 105 to transmit one or more insensitive (e.g. non-time-sensitive) control signals 223 between the apparatus 500 and the illumination source 105. For example, an enable control signal 523 may be transmitted from the apparatus 500 to the illumination source 105. When operation of the illumination source is enabled, the illumination source may begin to transmit the modulated EM waves 106. For example, FIG. 5 shows a TOF apparatus 500 comprising a pixel array 222, a reference recovery circuit 502 and a photodiode 503.

More details and aspects are mentioned in connection with the embodiments described above or below (e.g. regarding the illumination source). The embodiment shown in FIG. 5 may comprise one or more optional additional features corresponding to one or more aspects mentioned in connection with the proposed concept or one or more embodiments described above (e.g. FIGS. 1 to 4) or below (e.g. FIGS. 6 and 7).

FIG. 6 shows a schematic illustration of an apparatus 600 according to an embodiment. As shown in FIG. 6, the modulated EM waves may be emitted by the illumination source, for example. Multiple paths may be taken by the modulated EM waves. A path taken by the EM wave may result in the modulated EM waves being reflected by the object. Another path taken may be result in direct transmission to the apparatus. The implementation of the apparatus 600 is similar to the implementation shown in FIG. 5. For example, FIG. 6 shows a TOF apparatus 600 comprising a pixel array 222, a reference recovery circuit 602 and a photodiode 603.

More details and aspects are mentioned in connection with the embodiments described above or below (e.g. regarding the receiver circuit, the reference circuit, the sensor circuit, the processing circuit). The embodiment shown in FIG. 6 may comprise one or more optional additional features corresponding to one or more aspects mentioned in connection with the proposed concept or one or more embodiments described above (e.g. FIGS. 1 to 5) or below (e.g. FIG. 7).

Figure 7:
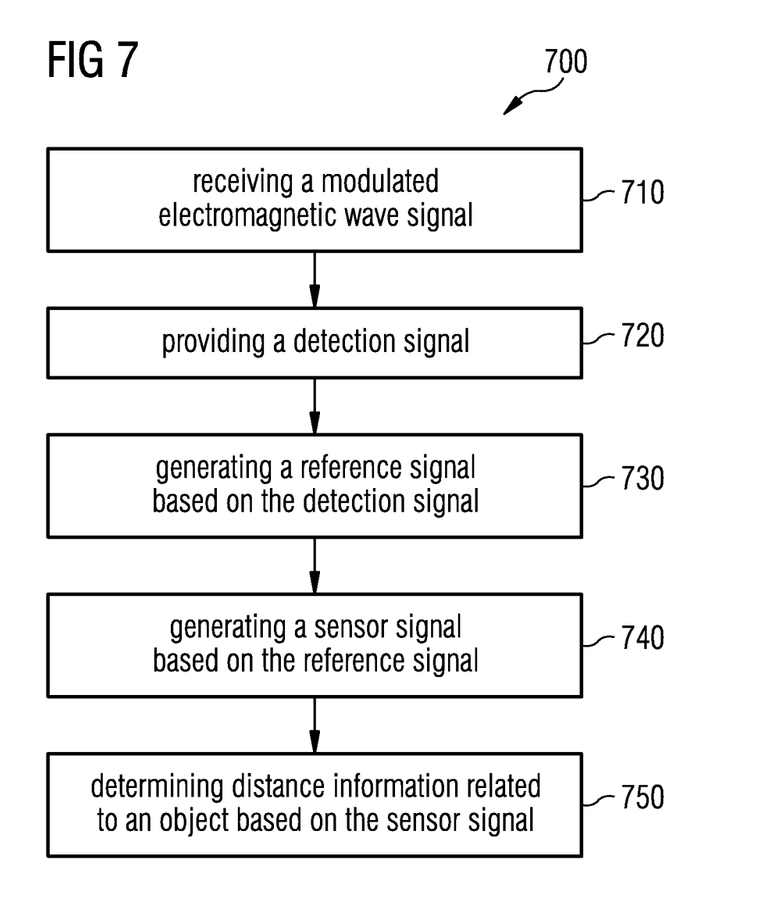
FIG. 7 shows a flow chart of a method for determining distance information of an object.

FIG. 7 shows a flow chart of a method 700 for determining distance information related to an object.

The method 700 may include receiving 710 a modulated electromagnetic wave signal from an illumination source and providing 720 a detection signal having a frequency dependent on a modulation frequency of the modulated electromagnetic wave signal.

The method 700 may further include generating 730 a reference signal based on the detection signal.

The method 700 may further include generating 740 based on the reference signal a sensor signal based on reflected modulated electromagnetic waves emitted by the illumination source and reflected by an object.

The method 700 may further include determining 750 distance information related to the object based on the sensor signal.

More details and aspects are mentioned in connection with the embodiments described above (e.g. regarding the modulated electromagnetic wave signal, the detection signal, the reference signal and sensor signal). The embodiment shown in FIG. 7 may comprise one or more optional additional features corresponding to one or more aspects mentioned in connection with the proposed concept or one or more embodiments described above (e.g. FIGS. 1 to 6).

Some embodiments describe herein relate to a time of flight system using a self-synchronized illumination unit. On-chip illumination control may result in distance measurement errors due to delays. For example, with on-chip illumination control, the imager may compare a first delay between a modulation reference generator and the pixel array with a second delay between the modulation reference generator and incident flight. By using an external illumination unit which may include a local reference oscillator, the external illumination control may emit modulated light, and the required reference signal may be generated locally, e.g. in the illumination control unit of the illumination source, with or by using a crystal oscillator, for example. The apparatus, (e.g. the imager) which receives this modulated light may generate its own reference with the help of a reference recovery unit, e.g. the reference circuit. Due to this implementation, a TOF system using a self-synchronized illumination unit may be achieved. The self-synchronized illumination unit may be implemented similarly to a clock recovery unit so that delays occurring in on-chip illumination control may be eliminated or suppressed.

Due to the above embodiments, delays such as those caused by components within an apparatus may be avoided, for example. Therefore, distortion of distance measurements may be avoided. The embodiments described above do not need any error-prone and expensive connection between imager and illumination unit, for example.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. An apparatus comprising:
    a detector circuit configured to receive a modulated electromagnetic wave signal from an illumination source external to the apparatus and to provide an oscillating detection signal having a frequency dependent on a modulation frequency of the modulated electromagnetic wave signal;
    a reference circuit configured to receive the oscillating detection signal and to generate an oscillating reference signal based on the oscillating detection signal;
    a sensor circuit comprising a pixel element to receive the oscillating reference signal and to receive reflected modulated electromagnetic waves emitted by the illumination source and reflected by an object, wherein the sensor circuit is configured to generate based on the oscillating reference signal a sensor signal based on reflected modulated electromagnetic waves emitted by the illumination source and reflected by the object; and
    a processing circuit configured to determine distance information related to the object based on the sensor signal.

2. The apparatus according to claim 1, wherein the detector circuit comprises an infra-red photodetector configured to generate the oscillating detection signal, and wherein the modulated electromagnetic wave signal is an infra-red electromagnetic wave signal.

3. The apparatus according to claim 1, wherein a frequency of the oscillating reference signal is equal to the frequency of the oscillating detection signal.

4. The apparatus according to claim 1, wherein the reference circuit is configured to generate a plurality of oscillating reference signals with different phase offsets, wherein the sensor circuit is configured to generate based on the plurality of oscillating reference signals a plurality of sensor signals based on the reflected modulated electromagnetic waves emitted by the illumination source and reflected by the object, and wherein the processing circuit is configured to determine the distance information related to the object based on the plurality of sensor signals.

5. The apparatus according to claim 1, wherein the reference circuit comprises a phase locked loop circuit or a delay locked loop circuit configured to generate the oscillating reference signal based on the oscillating detection signal.

6. The apparatus according to claim 5, wherein the phase locked loop circuit comprises:
    a phase comparator configured to generate an comparison signal based on a comparison of a phase of a reference oscillator signal and a phase of the oscillating detection signal received by the phase comparator; and
    a reference oscillator circuit configured to generate the reference oscillator signal, wherein the phase locked loop circuit is configured to adjust a phase of the reference oscillator signal to the phase of the oscillating detection signal based on the comparison signal.

7. The apparatus according to claim 5, wherein the reference circuit further comprises a phase shift circuit, wherein the phase shift circuit is configured to output sequentially a plurality of oscillating reference signals having different phase offsets compared to the oscillating detection signal.

8. The apparatus according to claim 5, wherein the phase locked loop circuit further comprises a loop filter having a bandwidth frequency range below 100 KHz.

9. The apparatus according to claim 1, wherein the sensor circuit comprises an array of pixel elements, each pixel element being configured to receive reflected modulated electromagnetic waves and to generate a sensor signal of the pixel element based on reflected modulated electromagnetic waves and the oscillating reference signal.

10. The apparatus according to claim 9, wherein each pixel element comprises a photodetector circuit configured to generate the sensor signal of the pixel element, wherein the sensor signal of the pixel element indicates a number of photogenerated charge carriers generated by the pixel element due to the reflected modulated electromagnetic waves.

11. The apparatus according to claim 1, wherein the processing circuit is configured to determine a maximum of a cross-correlation function based on the sensor signal and the oscillating reference signal to determine the distance information related to the object.

12. The apparatus according to claim 1, wherein the processing circuit is configured to produce a three-dimensional image of the object based on the distance information related to the object.

13. The apparatus according to claim 1, wherein the processing circuit is further configured to compare determined distance information related to a calibration object to a known distance value of the calibration object to determine a calibration offset value, and to determine the distance information related to the object based on the sensor signal and the calibration offset value.

14. The apparatus according to claim 1, wherein the illumination source and the apparatus are electrically isolated from each other.

15. An apparatus comprising:
a receiver circuit configured to receive a modulation control signal from an illumination source external to the apparatus, the modulation control signal having a modulation frequency based on a frequency of modulated electromagnetic waves emitted by the illumination source;

a reference circuit configured to generate a plurality of oscillating reference signals having different phase offsets based on the modulation control signal;

a sensor circuit comprising a pixel element to receive the oscillating reference signals and to receive reflected modulated electromagnetic waves emitted by the illumination source and reflected by an object, wherein the sensor circuit is configured to generate based on the plurality of oscillating reference signals a plurality of sensor signals based on reflected modulated electromagnetic waves emitted by the illumination source and reflected by the object; and a processing circuit configured to determine distance information related to an object based on the plurality of oscillating reference signals and the reflected modulated electromagnetic waves.

16. The apparatus according to claim 15, wherein the frequencies of the plurality of oscillating reference signals are equal to or a multiple of the modulation frequency of the modulation control signal.

17. The apparatus according to claim 15, wherein the reference circuit comprises a phase locked loop circuit, wherein the phase locked loop circuit comprises:

a phase comparator configured to generate an comparison signal based on a comparison of a phase of a reference oscillator signal and a phase of the detection signal received by the phase comparator; and a reference oscillator circuit configured to generate the reference oscillator signal, wherein the phase locked loop circuit is configured to adjust a phase of the reference oscillator signal to the phase of the detection signal based on the comparison signal.

18. The apparatus according to claim 17, wherein the reference circuit further comprises a phase shift circuit, wherein the phase shift circuit is configured to output sequentially a plurality of oscillating reference signals having different phase offsets compared to the detection signal.

19. The apparatus according to claim 15, wherein the illumination source and the apparatus are electrically isolated from each other.

* * * * *